Jan. 29, 1963  A. KOGAN  3,075,728
JET AIRPLANE ENGINE MOUNTING
Filed July 5, 1960

INVENTOR
ALEXANDER KOGAN

BY
ATTORNEYS 3,075,728
JET AIRPLANE ENGINE MOUNTING
Alexandre Kogan, 10 rue de Civry, Paris 16, France
Filed July 5, 1960, Ser. No. 40,940
Claims priority, application France July 2, 1959
3 Claims. (Cl. 244—74)

The present invention relates to multijet airplanes and has for its object to permit the airplane to fly along a straight rectilinear path when one or more of the jet engines fail to operate for any reason whatsoever.

It is a known fact that, when an airplane is equipped with more than one engine and when one or more of said engines break down, the plane cannot continue to fly along its predetermined path and has a tendency to deviate towards the right or the left according to the failure of the engines located on the right of the central longitudinal vertical plane of the airplane, or on the left respectively.

According to the present invention, the outlets of all the jet engines with which the airplane is equipped are connected to a common single tubular element located in the axial longitudinal vertical plane of the airplane, so that the jets of all the engines produce a single axial thrust.

It will be well understood that, whatever the engine failing to operate, the jet is always located in said central plane, so that no transversal component is applied to the airplane, the only result of such failure being a reduction of the power of the thrust.

According to an embodiment of the invention, the jet engines of an airplane are located in the vicinity of the tail of the airplane so as to reduce the length of the tubular connections between the outlets of the engines and the axial common outlet mentioned above.

It is particularly provided to equip the airplane with two jet engines located on both sides of the tail of the airplane and to provide an additional engine on the upper surface of the tail of the airplane and/or on the lower surface of the said tail.

However, it must be well understood that the invention is in no way limited to such a particular location of the engines, the invention covering every airplane comprising more than one jet engine and means to connect the outlets of said engines to a common outlet located in the central longitudinal vertical plane of the airplane.

Figure 1:
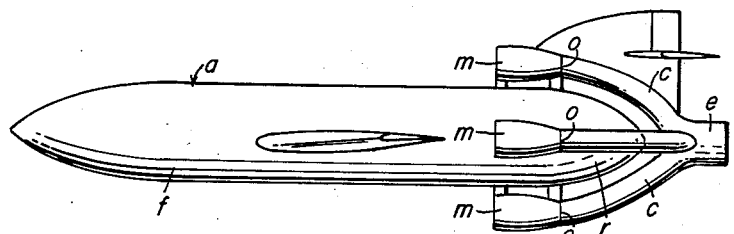
Figure 2:
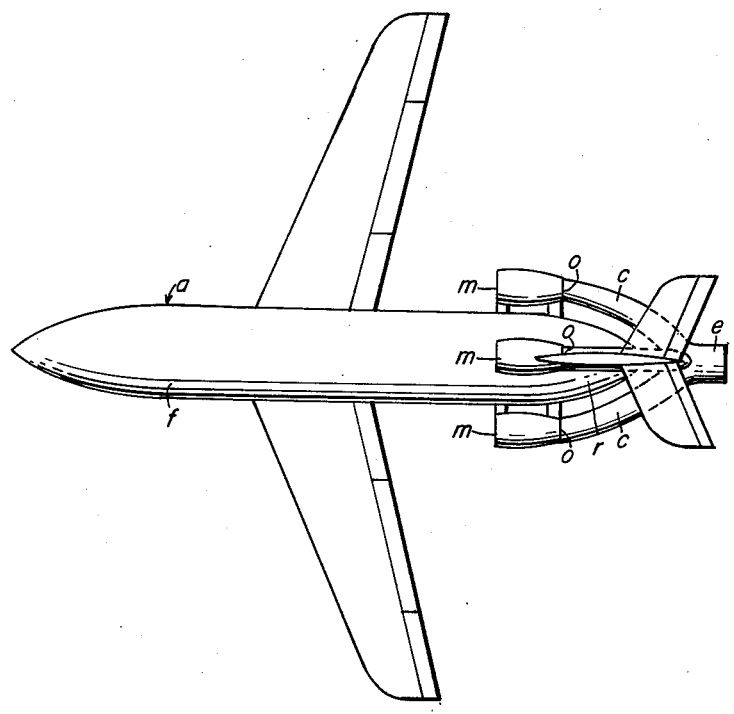

The invention will be better understood with reference to the accompanying drawings on which FIG. 1 shows a side view of an airplane comprising four tail jet engines with a common axial outlet, and FIG. 2 shows the same airplane in plan view.

Referring to the drawings, there is shown an airplane *a* including a fuselage *f* provided with a converging rear end *r*. Four engines *m* are positioned about the tail portion of the fuselage *f*. It will be noted that two of the engines are disposed diametrically opposite each other with respect to the sides of the fuselage while the other two engines are diametrically opposed with respect to the upper and lower surfaces of the fuselage.

Outlet *o* of each engine *m* is connected by an external conduit means *c* to a common tubular element *e* located at the rear end of the fuselage with such element *e* being positioned in the axial longitudinal vertical plane of the airplane whereby the jets of all engines *m* produce a single axial thrust.

It is believed apparent that the tubular element *e* is provided with a closed forward end and an open rearward end. The exhaust gases from the engines *m* do not pass through the forward end of the element *e* but rather through the open rearward end. More particularly, the conduit means *c* lead to the cylindrical portion of the tubular element *e* adjacent the closed end thereof. In other words, the conduit means *c* merge into each other so as to form the tubular element *e*.

The invention is not to be confined to any strict conformity to the showings in the drawings but changes or modifications may be made therein so long as such changes or modifications mark no material departure from the spirit and scope of the appended claims.

What I claim is:
1. An aircraft comprising a fuselage formed with a converging rear end, at least two jet engines mounted on said fuselage externally thereof and provided each with a rear jet discharge exit, an external tubular element positioned at said rear end of the fuselage concentric therewith and having a closed forward end and an open rearward end, and external conduit means connecting the exit of each jet engine to said forward end of the tubular element.

2. The aircraft as claimed in claim 1 in which said at least two jet engines are diametrically opposed.

3. An aircraft comprising a fuselage having a converging rear end at least two jet engines mounted on said fuselage externally thereof in diametrically opposed relationship, each of said engines having a rear jet discharge exit, an external conduit means leading from the exit of each jet engine to a location at the rear end of the fuselage, an external tubular element located at the rear end of the fuselage concentric therewith provided with a closed forward end and an open rearward end with said conduit means communicating with said tubular element aft of said closed forward end.

References Cited in the file of this patent
UNITED STATES PATENTS

| | | |
|---|---|---|
| 1,817,274 | Schuette | Aug. 4, 1931 |
| 2,611,555 | Custer | Sept. 23, 1952 |
| 2,885,159 | Ashwood | May 5, 1959 |
| 2,918,229 | Lippisch | Dec. 22, 1959 |

FOREIGN PATENTS

| | | |
|---|---|---|
| 756,135 | Great Britain | Aug. 29, 1956 |